Figure 1:
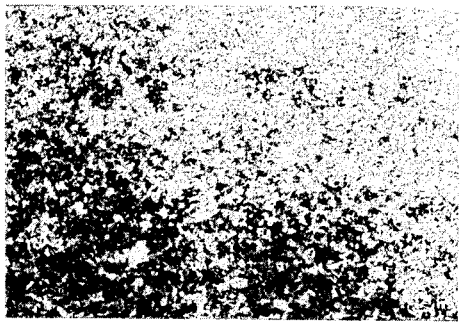
Figure 2:
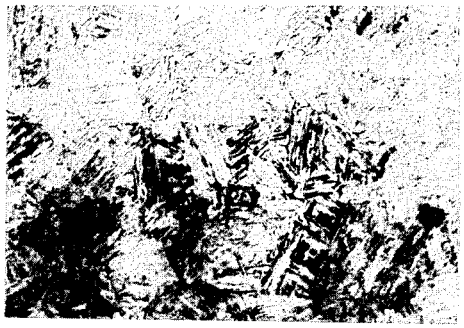

United States Defensive Publication [19] (H) [11] T964,003
Rehrer [43] Nov. 1, 1977

[54] HARDENABLE MARTENSITIC STAINLESS STEEL

[76] Inventor: Wilson P. Rehrer, R.D. No. 2, Box 496, Reading, Pa. 19605

[21] Appl. No.: 730,003

[22] Filed: Oct. 6, 1976

[51] Int. Cl.[2] ..... C22C 38/44; C22C 38/46; C22C 38/48

[52] U.S. Cl. ..... 75/128 G; 75/128 V; 75/128 W

[57] ABSTRACT

A corrosion resistant hardenable martensitic chromium stainless steel containing about 0.10–0.2% carbon, up to about 0.90% manganese, up to about 0.35% silicon, up to about 0.025% phosphorus, up to about 0.025% sulfur, about 11.00–12.50% chromium, about 2.00–3.00% nickel, about 1.50–2.00% molybdenum, about 0.25–0.40% vanadium, up to about 0.05% nitrogen, about 0.10–0.25% columbium, and the balance iron plus impurities. When austenitized at a temperature above about 1900° F, the steel has a grain size no coarser than about ASTM-7.

20 Claims, 1 Sheet Drawing,

14 Pages Specification

The file of this unexamined application may be inspected and copies thereof may be purchased (849 O.G. 1221, Apr. 9, 1968).